Nov. 14, 1933.    G. H. CONNORS    1,935,112
COUPLING MECHANISM FOR VEHICLES
Filed Nov. 19, 1932    4 Sheets-Sheet 3
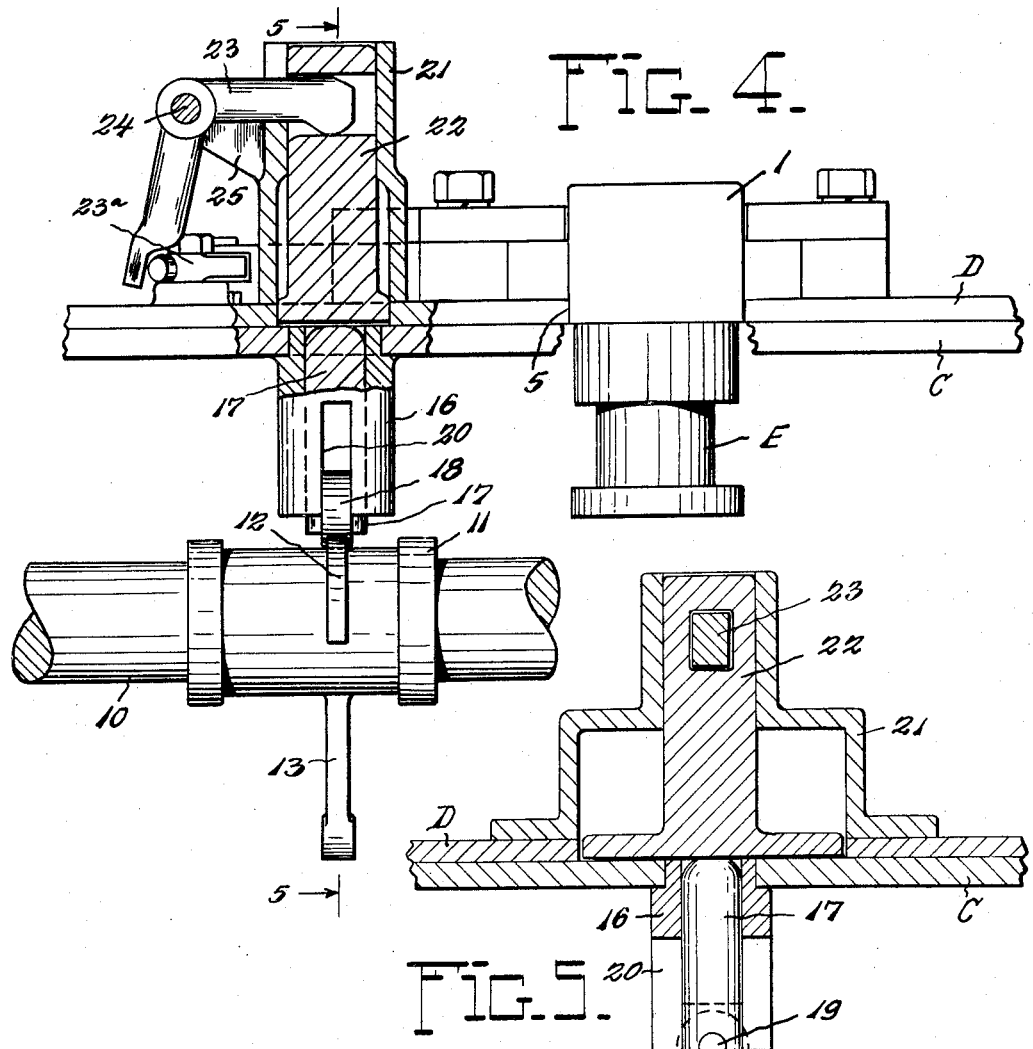

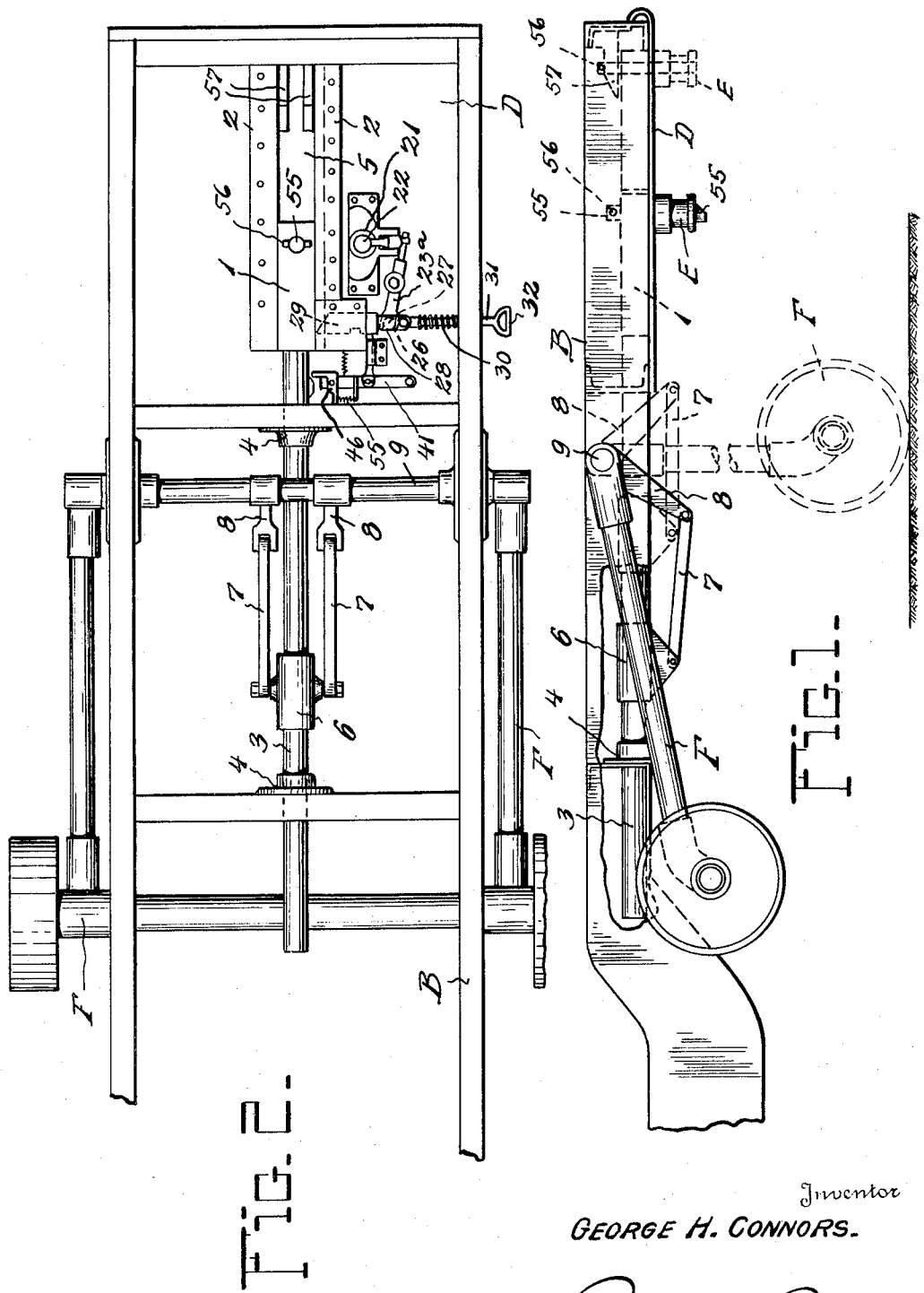

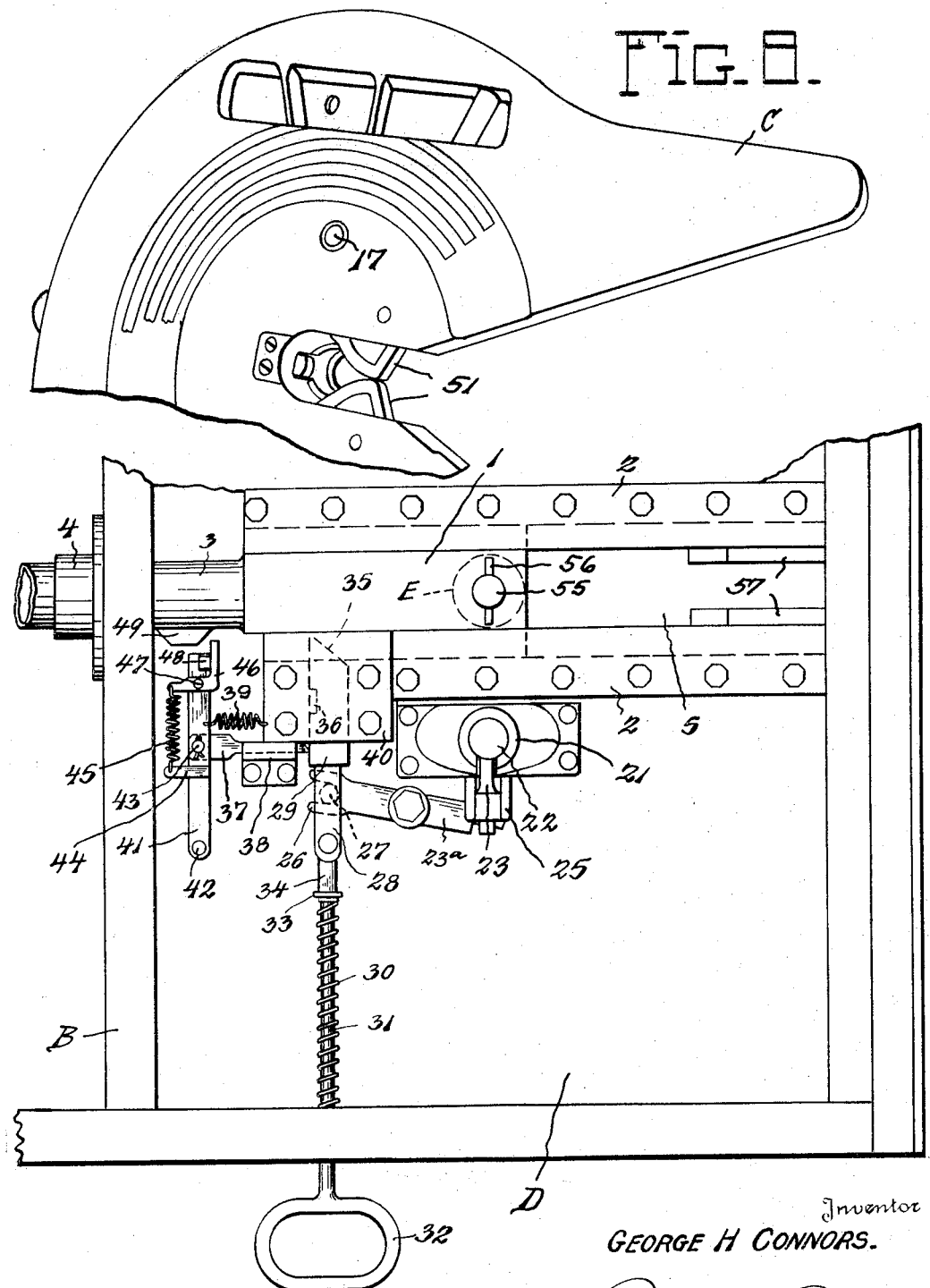

Nov. 14, 1933.     G. H. CONNORS     1,935,112
COUPLING MECHANISM FOR VEHICLES
Filed Nov. 19, 1932     4 Sheets-Sheet 4

Inventor
GEORGE H. CONNORS.

By Robb & Robb
Attorneys

Patented Nov. 14, 1933

1,935,112

UNITED STATES PATENT OFFICE 1,935,112

COUPLING MECHANISM FOR VEHICLES

George H. Connors, Edgerton, Wis., assignor to Highway Trailer Company, Edgerton, Wis., a corporation Application November 19, 1932
Serial No. 643,479

18 Claims. (Cl. 280—33.1)

The purpose of this invention has been to improve upon known types of tractor-trailer combination units at present being very largely used in the automotive vehicle art.

Since the largest number of tractor vehicles today in use for the purposes of hauling trailers are of a type utilizing what is known as a lower fifth wheel for cooperation and locking engagement with an upper fifth wheel and king pin on the trailer, one of the objectives of this invention has been to develop an improved trailer king pin mechanism for cooperation with the most generally used type of tractor vehicle and its fifth wheel.

In the type of trailer vehicle of this invention utilizing the improved king pin mechanism, it is contemplated to mount the king pin movably relatively to the trailer and utilize movement imparted to the king pin as the tractor backs into coupling relation to the trailer for accomplishing certain service operations in conjunction with mechanisms that are usually mounted upon the trailer.

Thus, in the present instance, the king pin device hereinafter set forth is adapted to work in conjunction with a supporting jack or wheeled support for the front end of the trailer, used when the trailer is uncoupled from the tractor, in such a manner as to move the jack or wheeled support into and out of operative position in relation to the ground.

Notwithstanding the employment of the special movable or slidable king pin mechanism that will be hereinafter described in detail, the said mechanism is fully adapted to be coupled with customary types of tractor lower fifth wheels at present in use, the king pin itself being designated for such purpose especially, though it is associated with other peculiar and special mechanisms that are operated by its movement for performing certain functions that have been touched upon in the foregoing statement.

The king pin carries a slide bar or reach which is actuated by the actuating movement incident to contact of the lower fifth wheel of the tractor with the king pin, thus moving the jack out of and into supporting position, in accordance with the movement of the reach and king pin.

Among other features of novelty, there may be mentioned the positioning of the supporting jack nearer the front of the trailer than is conventional, thereby removing the danger of the trailer "nose diving" or tipping forward when loaded heavily at the front when standing on the jack; the provision of simplified mechanism for locking the king pin relatively to the trailer simultaneously with the interlocking thereof with the fifth wheel members of the tractor and trailer; the provision of novel instrumentalities on the tractor fifth wheel for actuating the locking mechanism to unlock the same while at the same time releasing the king pin of the trailer to effect uncoupling of the vehicles. This locking mechanism embraces, in general, the provision of a lock member slidable into and out of engagement with the king pin mechanism to hold the said mechanism in coupling position, and to release the said king pin mechanism for movement to uncoupling position as the tractor moves away from the trailer, there being provided instrumentalities, as has been indicated above, associated with the fifth wheels of the vehicles, for withdrawing the lock member from engagement with the king pin mechanism when the vehicles are to be uncoupled, means for actuating the said instrumentalities being positioned in the cab of the tractor readily accessible to the operator.

The invention further contemplates the provision of novel means for securing the lock member in withdrawn position these means being automatically operative to snap into engagement with the lock member when the latter has been withdrawn a suitable distance from the king pin mechanism. The means referred to here include a novel system of levers mounted so as to be actuated by a trip positioned on the aforesaid slide bar or reach as the latter is moved responsively to coupling operations, so that the lock member will be released to resume locking engagement with the king pin mechanism, the said system of levers enabling the trip to pass freely when the king pin mechanism is moved to uncoupling position.

In addition to the above indicated mechanism for withdrawing the lock member from engagement with the king pin mechanism, means for manually withdrawing the locking member may be provided for alternative use, if desired; also as has been indicated the lock member is provided with means for automatically returning it into locking engagement with the king pin mechanism when the lock member is released from its withdrawn position.

The details of the construction above outlined, together with other novel details introduced by this invention will be described in detail hereinafter. In the drawings,—

Figure 1 represents a fragmentary side elevation of a trailer vehicle embracing certain improvements of this invention.

Figure 2 is a top plan view of the mechanism of Figure 1, showing additionally certain features of the locking mechanism for the king pin.

Figure 3 is a fragmentary plan view of the trailer showing the locking mechanism of Figure 2 on an enlarged scale.

Figure 4 is a somewhat diagrammatic view, partly in section and partly in elevation, showing the upper and lower fifth wheels in interlocked relation and showing the king pin in coupled position with certain features of the king pin lock controlling mechanism and actuating means therefor.

Figure 5 is a sectional view taken on the line 5—5 of Figure 4.

Figure 8 is a fragmentary top perspective view of the lower fifth wheel of Figures 6 and 7.

Figure 9 is a side elevation of a truck and trailer coupled together, showing the manner of controlling the mechanism of this invention from the cab of the truck.

Figure 6:
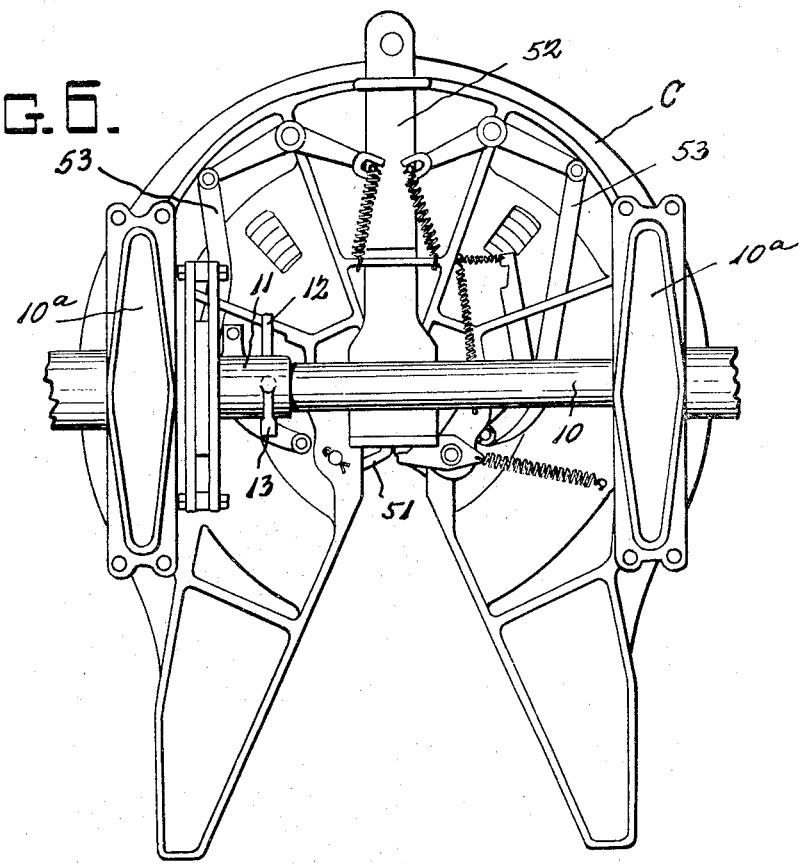
Figure 6 is a bottom view of a standard type of lower fifth wheel, but provided with certain improvements of this invention.
Figure 7:
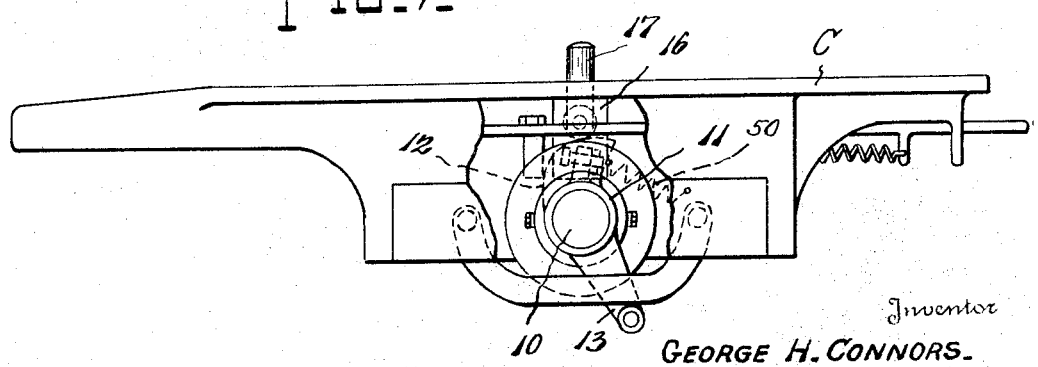
Figure 7 is a side elevation of the lower fifth wheel of Figure 6, showing the lower fifth wheel partially broken away.

Referring more particularly to the drawings, it will be seen that the truck A and trailer B are provided with the lower fifth wheel C and upper fifth wheel, D, respectively, each of standard construction, which are adapted to be coupled together by means of a king pin E, in the usual manner, the king pin being mounted to move axially of the trailer responsively to coupling and uncoupling movements of the vehicles. Movement of the king pin actuates the movement of the trailer supporting jack F out of and into supporting position.

Referring first to the king pin construction, it will be observed that the king pin E is mounted in a block 1, being desirably integral therewith, which block is mounted for movement in guides 2, and carries a slide bar or reach 3, which is mounted in guides 4 carried by suitable cross members of the trailer frame.

In order to allow this movement of the king pin, of course the upper fifth wheel must be provided with a suitable slot 5.

It has been mentioned that movement of the king pin incident to the coupling and uncoupling operations between the vehicles will actuate the jack F to move the jack out of and into supporting position; and it has also been mentioned that this jack is positioned farther forward of the trailer than it is usual in order to remove all likelihood of the trailer tipping forwardly when loaded heavily at the front when standing on the jack. To enable the movement of the king pin to corespondingly actuate the jack, and to enable the jack to be so positioned, the reach 3 is provided with a bracket 6 provided with forwardly extending arms 7 connected with levers 8 secured to the cross shaft 9 of the jack F. It will therefore be seen that forward movement of the king pin and block 1 will effect a lowering of the jack, and rearward movement of the king pin relatively to the trailer will raise the jack. The lowering of the jack is of course timed so that it will be fully moved into supporting position before the tractor actually moves from coupled position, so that the trailer will be assured of support by the time that the vehicles are actually operated.

In order to secure the king pin in its proper position when the vehicles are coupled, a locking device and actuating mechanism therefor must be provided, which mechanism will now be described.

In the well understood manner, the lower fifth wheel C is mounted on shaft 10 mounted in the frame of the tractor and carried in brackets 10a in the customary manner, so that the fifth wheel C may tilt suitably for coupling. On this shaft 10 is turnably mounted a sleeve 11 carrying a cam 12 which is actuated by the lever 13 conveniently integral with the cam 12. Secured to this lever is a rod 14 which leads to the cab of the truck and is operated therein by lever 15.

Mounted on the under-side of the lower fifth wheel C is a housing 16 in which vertically moves the pin 17 carrying at its lower end the roller 18 mounted on pin 19, the roller 18 engaging the cam 12, which actuates the pin 17 to move the pin vertically in either direction upon actuation of the cam 12. The housing 16 is slotted at 20 to enable the cam 12 to enter the housing. The fifth wheel C is suitably apertured to enable the pin 17 to pass through the surface of the fifth wheel. Registering with this aperture is a corresponding aperture in the upper fifth wheel D, over which is placed the housing 21 containing a plunger 22 which is actuated by the push pin 17 to operate the bell lever 23 which is pivoted at 24 to lugs 25 on the housing 21. The lever 23 actuates a second lever 23a.

The end of this lever 23a is bifurcated as shown at 26, in which bifurcation is positioned the lug 27 of the shank 28 of the king pin locking member 29. This lock 29 is retained in engagement with king pin block 1 through the provision of spring 30 enclosing the shank 31 of the handle 32, the spring 30 bearing against one of the side members of the trailer frame and against a collar 33 of the extension 34 of the lock shank 28.

This mechanism just described is such that when the rod 14 is pulled by corresponding actuation of the lever 15 to move the cam 12 so as to raise the pin 17 and the plunger 22 against the lever 23, the lever 23a will be actuated to retract the lock 29 out of engagement with the king pin block 1, while opposite movement of the cam 12 will correspondingly produce an opposite movement of the lever 23a to allow the spring 30 to reengage the lock 29 with the king pin block 1. To render the lock 29 active against the king pin block 1, the latter is provided with a suitable notch 35 in which the lock 29 is adapted to snap when it is in registry therewith to hold the king pin is retracted position.

It is necessary to provide mechanism for securing the lock 29 in retracted position when the vehicles are uncoupled. For this purpose the lock 29 is provided with a notch 36 which is adapted to engage a pawl 37 operating in a guide 38 and actuated by a spring 39 operating between the lock guide 40 and lever 41 which is fulcrumed at 42, and to which the pawl 37 is pivoted at 43. This spring 39 holds the pawl 37 in engagement with the lock 29 and enables it to snap into engagement with the notch 36 to hold the lock out of engagement with the king pin block 1 so that the king pin may be drawn forwardly for uncoupling and the lock 29 maintained in retracted position while the vehicles are uncoupled.

To release the pawl 37 from engagement with the notch 36 there is provided a mechanism which includes an arm 44 mounted on the lever 41 and extending therefrom, to which arm there is secured a spring 45 which is in turn connected with one arm of a bell crank 46 pivotally mounted at 47 on the lever 41. This crank 46 is free to turn in one direction, but is restrained from movement in the opposite direction by a stop 48 mounted on the lever 41.

It will be seen, therefore, that when the king pin block 1 is moved forwardly of the trailer during uncoupling operations, and when the lock 29 is withdrawn from engagement therewith in the manner previously described, the pawl 37 will snap into engagement with the notch 36 and hold the lock in retracted position; as the king pin block 1 moves forwardly, the trip 49 on the reach 3 engages the lever 46 to move this lever sufficiently to enable the trip to pass by. Now when the vehicles are coupled, and the king pin correspondingly moved rearwardly, the trip 49 will engage the lever 46 so as to force the lever against the stop 48 so as to push upon the lever 46 and stop 48 to cause lever 41 to turn on its fulcrum 42, thereby retracting pawl 37 from its engagement with notch 36 and allowing spring 30 to snap the lock 29 back into locking engagement with the king pin block 1. The spring 45 acts to maintain the lever 46 normally in engagement with stop 48.

The cam 12 is normally maintained in the position shown by the provision of a return spring 50.

The operation of the lock 29 to retract it from its engagement with the king pin block 1 as previously described, is effected simultaneously with the release of the jaws 51 of the lower fifth wheel C, which release is necessary to enable the king pin to withdraw from locking engagement with the fifth wheel C, and which withdrawal is accomplished in the usual manner through actuation of the arm 52, which in turn actuates the lever system 53 in the well known manner. This construction is standard and need not be described in detail; but to effect simultaneous operation of the jaws 51 with the lock, the arm 52 is inter-connected at 54 with the control rod 14; so that actuation of the rod 14 through the lever 15 in the cab of the truck will correspondingly operate the arm 52 simultaneously with the operation of the cam 12 and the lock mechanism.

There is to be mentioned the fact that within the king pin E is mounted a locking pin 55 through the end of which is passed a cross-pin 56 which is adapted to engage the wedge blocks 57 positioned at the forward end of the guides 2, whereby the locking pin 55 is withdrawn from locking engagement with the lower fifth wheel C as the cross-pin 56 rides on the wedge blocks 57 as indicated by dotted lines in Figure 1. This locking pin 55 is normally held in locking position by means of a spring, not shown, within the king pin E.

It will be understood that the lock 29 may be manipulated through the mechanism above described, or it may be manipulated through handle 32.

It has been said that the opening in the upper fifth wheel B through which the plunger 22 extends, is cut on a radius struck from the center of the king pin when locked in coupled position. This aperture is in the form of an arcuate slot and is of sufficient length as is the base of plunger 22, to permit disconnecting of the vehicles by means of the cab control lever 15 when the vehicles are at an angle to each other of 20° or less, this being a suitable angle for convenient coupling and uncoupling of the vehicles.

Having thus described my invention, what I claim as new and desire to secure by Letters Patent of the United States, is—

1. Coupling mechanism for vehicles, comprising the combination with a vehicle frame, of a king pin movably carried by the frame responsively to engagement of coupling means therewith, locking instrumentalities for the king pin, mechanism for locking the king pin in coupled position, and instrumentalities for simultaneously operating the locking mechanism and coupling means for releasing the king pin to uncouple the vehicles.

2. Coupling mechanism for vehicles comprising the combination with a vehicle frame, of a king pin assembly movably carried by the frame responsively to engagement of coupling means therewith, locking instrumentalities for the king pin assembly including a locking member movable into and out of engagement with the said assembly, means normally urging the locking member into engagement with the said king pin assembly, instrumentalities for withdrawing the locking member from engagement with the king pin assembly, and automatically operable means engaging the rocking member for securing the locking member in withdrawn position.

3. Coupling mechanism for vehicles, comprising the combination with a vehicle frame, of a king pin assembly movably carried by the frame responsively to engagement of coupling means therewith, locking instrumentalities for the king pin assembly including a locking member movable into and out of engagement with the said assembly, means normally urging the locking member into engagement with the said king pin assembly, instrumentalities for withdrawing the locking member from engagement with the king pin assembly, a pawl for securing the locking member in withdrawn position, and mechanism for actuating the pawl responsively to the withdrawal of the locking member.

4. Coupling mechanism for vehicles, comprising the combination with a vehicle frame, of a king pin assembly movably carried by the frame responsively to engagement of coupling means therewith, locking instrumentalities for the king pin assembly including a locking member movable into and out of engagement with the said assembly, means normally urging the locking member into engagement with the said king pin assembly, instrumentalities for withdrawing the locking member from engagement with the king pin assembly, a pawl for securing the locking member in withdrawn position, mechanism for actuating the pawl responsively to the withdrawal of the locking member, and instrumentalities for releasing the pawl simultaneously with the coupling of the vehicles.

5. Coupling mechanism for vehicles comprising, in combination, a tractor and a trailer having, respectively, the usual upper and lower fifth wheel members, a king pin assembly movably mounted on the trailer, locking mechanism for locking the king pin assembly in coupling position responsively to movement thereof incident to coupling operation of the vehicles, instrumentalities on the fifth wheel members for operating the locking mechanism, and means for actuating the said instrumentalities.

6. Coupling mechanism for vehicles comprising, in combination, a tractor vehicle and a trailer vehicle, having respectively, the usual upper and lower fifth wheel members, a king pin assembly movably mounted on the trailer, locking mechanism for locking the king pin assembly in coupling position responsively to movement thereof incident to coupling operation of the vehicles, instrumentalities on the fifth wheel members, including a plunger and a pin to operate the plunger, for operating the locking mechanism, and means for actuating the said instrumentalities.

7. Coupling mechanism for vehicles comprising, in combination, a tractor vehicle and a trailer vehicle, having, respectively, the usual upper and lower fifth wheel members, the lower fifth wheel member having the usual king pin engaging jaws, a king pin assembly movably mounted on the trailer, locking mechanism for locking the king pin assembly in coupling position responsively to movement thereof incident to coupling operation of the vehicles, instrumentalities on the fifth wheel members for operating the locking mechanism to effect release of the king pin from its coupling position, means for actuating the said instrumentalities, and mechanism for releasing the jaws of the lower fifth wheel member simultaneously with the operation of the said instrumentalities.

8. Coupling mechanism for vehicles comprising, in combination, a vehicle frame, a king pin assembly carried thereby and adapted to movement relatively thereto incident to engagement of a coupling member therewith, the king pin assembly including a king pin, a block carrying the king pin, and a slide bar carried by the block, a lock member adapted to engage the block when the king pin and block have moved a predetermined distance for locking the king pin in position, instrumentalities for moving the lock out of engagement with the block for releasing the king pin for uncoupling thereof, mechanism for automatically securing the lock member out of engagement with the king pin assembly, and means for actuating the said mechanism upon coupling movement of the king pin and block to release the lock member for again locking the king pin in coupling position.

9. Coupling mechanism for vehicles comprising, in combination, a vehicle frame, a king pin assembly carried thereby and adapted to movement relatively thereto incident to engagement of a coupling member therewith, the king pin assembly including a king pin, a block carrying the king pin, and a slide bar carried by the block, a lock member adapted to engage the block when the king pin and block have moved a predetermined distance for locking the king pin in position, instrumentalities for moving the lock out of engagement with the block for releasing the king pin for uncoupling thereof, mechanism for automatically securing the lock member out of engagement with the king pin assembly, and means for actuating the said mechanism upon coupling movement of the king pin and block to release the lock member for again locking the king pin in coupling position, the said means comprising a trip mounted on the slide bar, the said trip engaging the mechanism as the king pin moves, the mechanism including a member yieldable in one direction under engagement of the trip but unyieldable under reverse engagement of the trip, thereby releasing the lock member.

10. Coupling mechanism for vehicles comprising, in combination, a vehicle frame, a king pin carried thereby and mounted for movement relatively thereto upon engagement of a coupling member, a lock member adapted to lock the king pin in coupling position, mechanism for withdrawing the lock to release the king pin for movement to uncoupling position, instrumentalities for holding the lock member in withdrawn position, and means for actuating the said instrumentalities for releasing the lock member to enable it to assume locking position responsively to movement of the king pin to coupled position.

11. Coupling mechanism for vehicles comprising, in combination, a vehicle frame, a king pin carried thereby and mounted for movement relatively thereto upon engagement of a coupling member, a lock member adapted to lock the king pin in coupling position, mechanism for withdrawing the lock to release the king pin for movement to uncoupling position, instrumentalities for holding the lock member in withdrawn position, the said instrumentalities including a pawl, a lever carrying the pawl, and a spring pressing the said pawl against the lock member, and means for actuating the said mechanism for withdrawing the pawl from its holding position relatively to the lock member to enable the latter to assume locking position responsively to movement of the king pin to coupling position.

12. Coupling mechanism for vehicles, comprising, in combination, a tractor vehicle and a trailer vehicle having respectively the usual upper and lower fifth wheel members, a king pin carried by the trailer vehicle and mounted for movement relative thereto upon engagement of the lower fifth wheel member therewith, a lock member adapted to lock the king pin in coupling position, mechanism for withdrawing the lock to release the king pin, the said mechanism including a lever in engagement with the lock member, and lever actuating instrumentalities carried by the fifth wheel members, instrumentalities for holding the lock member in withdrawn position, and means for actuating the said lever operating instrumentalities for effecting withdrawal of the said lock member.

13. Coupling mechanism for vehicles comprising, in combination, a vehicle frame, a king pin carried thereby and mounted for movement relatively thereto upon engagement of a coupling member, a lock member adapted to lock the king pin in coupling position, mechanism for withdrawing the lock to release the king pin for movement to uncoupling position, instrumentalities for holding the lock member in withdrawn position, the said instrumentalities including a pawl, a lever carrying the pawl, and a spring pressing the said pawl against the lock member, and a trip member operated by movement of the king pin for actuating the said mechanism for withdrawing the pawl from its holding position relatively to the lock member to enable the latter to assume locking position responsively to movement of the king pin to coupled position the said mechanism being adapted to enable the said trip to pass freely by the mechanism without actuation of the pawl when the king pin is moved to uncoupling position.

14. Coupling mechanism for vehicles comprising, in combination, a vehicle frame, a king pin carried thereby and mounted for movement relatively thereto upon engagement of the coupling member, a lock member adapted to lock the king pin in coupling position, mechanism for withdrawing the lock to release the king pin for movement to uncoupling position, instrumentalities for holding the lock member in withdrawn position, the said instrumentalities including a pawl, a lever carrying the pawl, a spring pressing the said pawl against the lock member, a stop on one end of the said lever, a second lever mounted on the aforesaid lever in engagement with the stop and adapted to move away from the said stop in one direction and to press against the said stop in the opposite direction, and means for actuating the said mechanism for withdrawing the pawl from its holding position relatively to the said lock member to enable the latter to assume locking position responsively to movement of the king pin to coupled position, the said means including a trip adapted to engage the second lever to force the same against the stop to operate the first mentioned lever for withdrawal of the pawl from holding engagement with the lock member, the said second lever being mounted to enable the trip to freely pass when the king pin is withdrawn to uncoupled position.

15. Coupling mechanism comprising, in combination, a tractor vehicle and a trailer vehicle having, respectively, the usual upper and lower fifth wheel members, a king pin mounted on the trailer vehicle for movement relatively thereto upon engagement of the lower fifth wheel member, a lock member adapted to lock the king pin in coupling position, mechanism for withdrawing the lock to release the king pin for movement to uncoupling position, the said mechanism including a lever coupled with the locking member, a plunger mounted on the upper fifth wheel member, a plunger actuating member on the lower fifth wheel member, and means for operating the said member as the vehicles are uncoupled.

16. Coupling mechanism for vehicles comprising, in combination, a tractor vehicle and a trailer vehicle having respectively, the usual upper and lower fifth wheel members, the lower fifth wheel member having its usual king pin engaging jaws, a king pin mounted on the trailer vehicle for movement relatively thereto upon engagement of the lower fifth wheel member therewith, a lock member adapted to lock the king pin in coupling position, mechanism for withdrawing the lock to release the king pin for movement to uncoupling position, the said mechanism including a lever, a plunger on the upper fifth wheel member, a vertically movable pin on the lower fifth wheel member, and an actuating means for moving the said pin, and means for releasing the said jaws simultaneously with actuation of the said pin to enable the fifth wheel members to be uncoupled as the king pin is released.

17. A coupling mechanism for vehicles comprising a tractor vehicle having, respectively, the usual upper and lower fifth wheel members, a king pin mounted on the trailer vehicle for movement relatively thereto upon engagement of the lower fifth wheel member therewith, a lock member adapted to lock the king pin in coupling position, and mechanism for withdrawing the lock to release the king pin for movement to uncoupled position, the said mechanism including a lever, lever actuating members mounted on the fifth wheel members, a cam for actuating the lever actuating members, and means for operating the cam.

18. Coupling mechanism for vehicles comprising, in combination, a tractor vehicle and a trailer vehicle having, respectively, the usual upper and lower fifth wheel members, the lower fifth wheel member having the usual king pin engaging jaws, a king pin mounted on the trailer vehicle for movement relatively thereto upon engagement of the lower fifth wheel member therewith, a lock member adapted to lock the king pin in coupled position, mechanism including cooperating movable members mounted on the fifth wheel members for withdrawing the said lock member to release the king pin for movement to uncoupled position, a cam for operating the said members on the fifth wheel members, means for operating the cam, and instrumentalities interconnected with the said cam operating means to release the said jaws simultaneously with withdrawal of the lock member from its engagement with the king pin.

GEORGE H. CONNORS.